United States Patent
Lindley

(10) Patent No.: US 9,414,704 B1
(45) Date of Patent: Aug. 16, 2016

(54) WIRE STRIPPER

(71) Applicant: Adam W. Lindley, Green Bay, WI (US)

(72) Inventor: Adam W. Lindley, Green Bay, WI (US)

(73) Assignee: SAS OF LUXEMBURG, LTD., Luxemburg, WI (US)

( * ) Notice: Subject to any disclaimer, the term of this patent is extended or adjusted under 35 U.S.C. 154(b) by 43 days.

(21) Appl. No.: 14/581,168

(22) Filed: Dec. 23, 2014

(51) Int. Cl.
*B02C 1/00* (2006.01)
*A47G 25/80* (2006.01)
*B08B 1/00* (2006.01)
*B23P 19/04* (2006.01)

(52) U.S. Cl.
CPC . *A47G 25/80* (2013.01); *B02C 1/00* (2013.01); *B08B 1/005* (2013.01); *B23P 19/047* (2013.01); *B23P 2700/50* (2013.01)

(58) Field of Classification Search
CPC ... Y10T 83/9493; B08B 1/005; B23P 19/047; B23P 2700/50; A47G 25/80; B02C 1/00; B02C 1/02; B02C 1/04; B02C 1/06
USPC .............. 30/90.1, 90.4; 81/9.4, 9.51
See application file for complete search history.

(56) References Cited

U.S. PATENT DOCUMENTS

| | | | | |
|---|---|---|---|---|
| 846,694 A * | 3/1907 | Paul | ....................... | A47G 25/80 223/114 |
| 2,525,174 A * | 10/1950 | Johnstone | .............. | A47G 25/80 15/104.001 |
| D226,245 S * | 1/1973 | Cairns | ........................... | 223/115 |
| 3,848,494 A * | 11/1974 | Gargrave | ............... | B21D 37/14 100/18 |
| D286,580 S * | 11/1986 | Stirling | ......................... | D2/642 |
| 5,385,279 A * | 1/1995 | Dawson | ................. | A47G 25/80 223/114 |
| 6,129,298 A * | 10/2000 | Nye | ....................... | E02F 3/965 241/101.73 |
| 6,135,331 A * | 10/2000 | Davis | ..................... | A47G 25/80 223/111 |
| 6,702,163 B1 * | 3/2004 | Hopping | ................ | A47G 25/80 223/113 |
| 2006/0144119 A1 * | 7/2006 | Chun | ..................... | B21D 28/32 72/452.9 |
| 2011/0101048 A1 * | 5/2011 | Moore, Sr. | ............. | A47G 25/86 223/114 |

OTHER PUBLICATIONS

Kobelco brochure downloadable from www.kobelco-usa.com/sites/kobelco-usa.com/files/KOBELCO%20SK210D.pdf, see bottom of p. 7.

* cited by examiner

*Primary Examiner* — Phong Nguyen
(74) *Attorney, Agent, or Firm* — Donald J. Ersler

(57) ABSTRACT

A wire stripper preferably includes a base plate, at least one vertical support plate and a stripper plate. The base plate includes a plurality of fastener holes. The at least one vertical support plate extends upward from the base plate. A bottom of the stripper plate is attached to a top of the at least one vertical support plate. A top of the vertical support plate is angled, such that the stripper plate forms an acute angle with a horizontal plane. A V-shaped groove is formed in substantially one end of the stripper plate to form two fingers. The wire stripper is preferably attached to an arm of a hold down attachment. The hold down attachment is retained on an auto dismantling excavator. An auto dismantling grappler extends from a boom of the auto dismantling excavator and the grappler is used to pull a wiring harness through the stripper plate.

4 Claims, 6 Drawing Sheets

WIRE STRIPPER

BACKGROUND OF THE INVENTION

1. Field of the Invention

The present invention relates generally to recycling and more specifically to a wire stripper, which may be used to strip material and objects from a vehicle wiring harness.

2. Discussion of the Prior Art

Kobelco USA discloses a hold down arm for auto recycling, which includes a horizontal plate with a V-shaped groove. A wiring harness or the like may be inserted into the V-shaped groove and pulled against the horizontal plate. However, it is difficult for an operator to see the wiring harness being stripped with the horizontal plate.

Accordingly, there is a clearly felt need in the art for a wire stripper for attachment to a hold down attachment, which may be used to strip material and objects from a vehicle wiring harness.

SUMMARY OF THE INVENTION

The present invention provides a wire stripper, which may be used to strip material or objects from a vehicle wiring harness. The wire stripper preferably includes a base plate, at least one vertical support plate and a stripper plate. The base plate includes a plurality of fastener holes. The at least one vertical support plate extends upward from the base plate. A bottom of the stripper plate is attached to a top of the at least one vertical support plate. A top of the vertical support plate is angled, such that the stripper plate forms an acute angle with a horizontal plane. A V-shaped groove is formed in substantially one end of the stripper plate to form two fingers. A support gusset is preferably attached to a bottom of each finger. A mounting plate is preferably retained on each arm of a hold down attachment. The mounting plate includes retention holes, which mate with the plurality of fastener holes in the base plate. The base plate is secured to the mounting plate with a plurality of fasteners. The hold down attachment is mounted to an auto dismantling excavator. In use, an auto dismantling grappler is mounted to end of a boom of the auto dismantling excavator. An operator removes a wiring harness from a vehicle with the auto dismantling grappler. The operator then inserts a first end of the wiring harness into the V-shaped groove of the stripper plate. The wiring harness is then pulled through the stripper plate to remove material and objects attached to the wiring harness, until the wiring harness is completely pulled through the stripper plate.

Accordingly, it is an object of the present invention to provide a wire stripper for attachment to a hold down attachment, which may be used to strip material and objects from a vehicle wiring harness.

These and additional objects, advantages, features and benefits of the present invention will become apparent from the following specification.

DETAILED DESCRIPTION OF THE PREFERRED EMBODIMENTS

Figure 1:
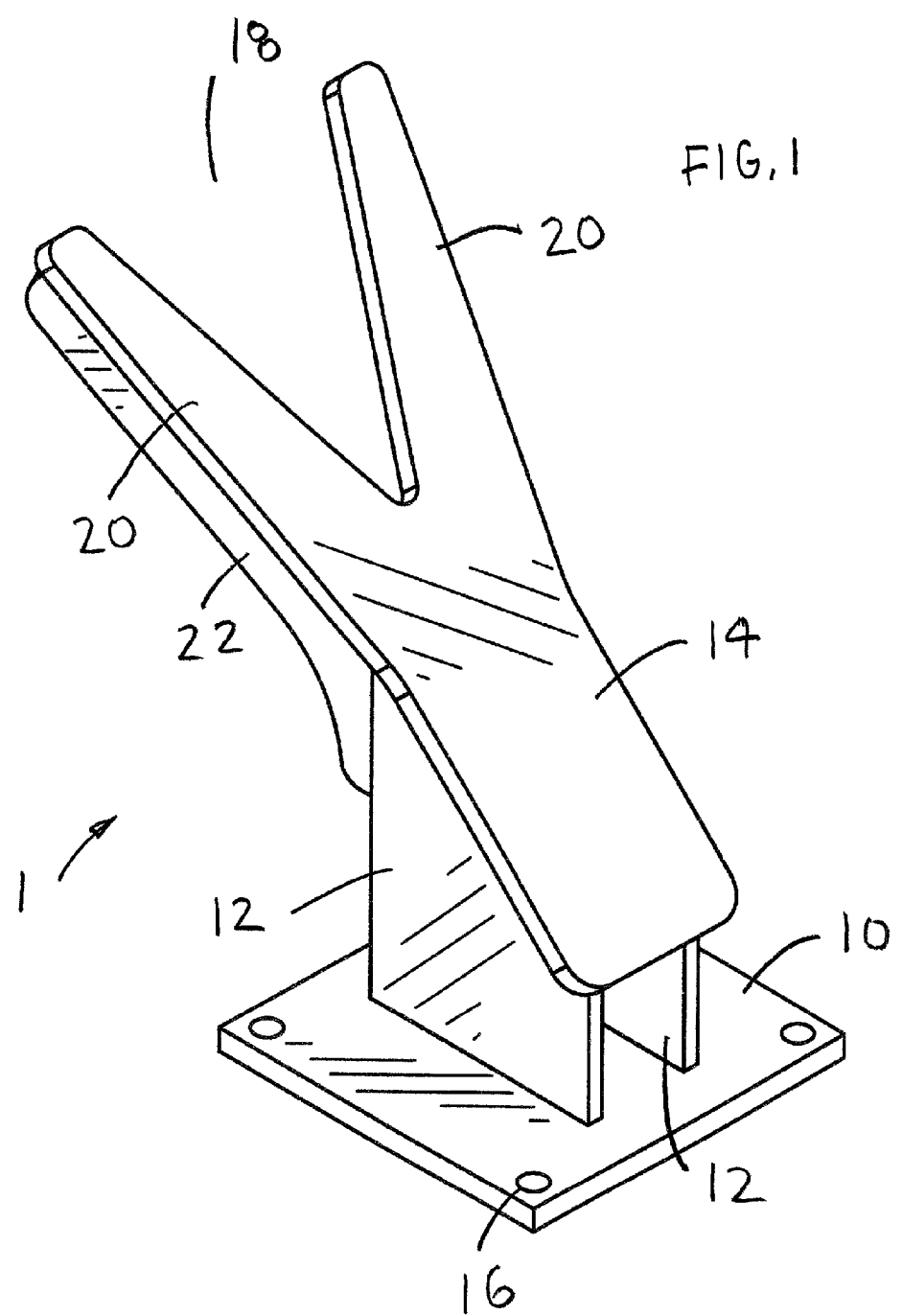
FIG. 1 is a perspective view of a wire stripper in accordance with the present invention.
Figure 2:
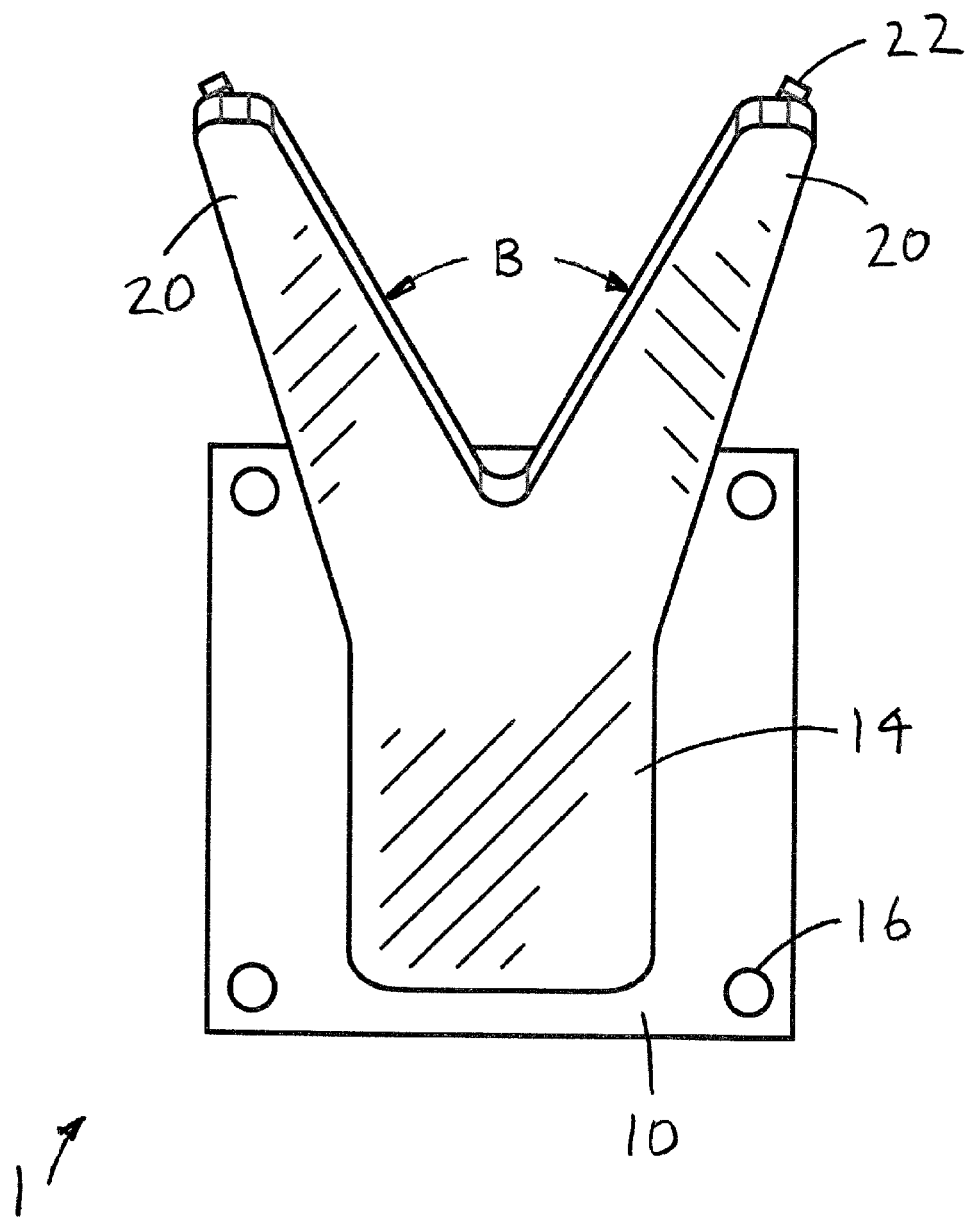
FIG. 2 is a top view of a wire stripper in accordance with the present invention.
Figure 3:
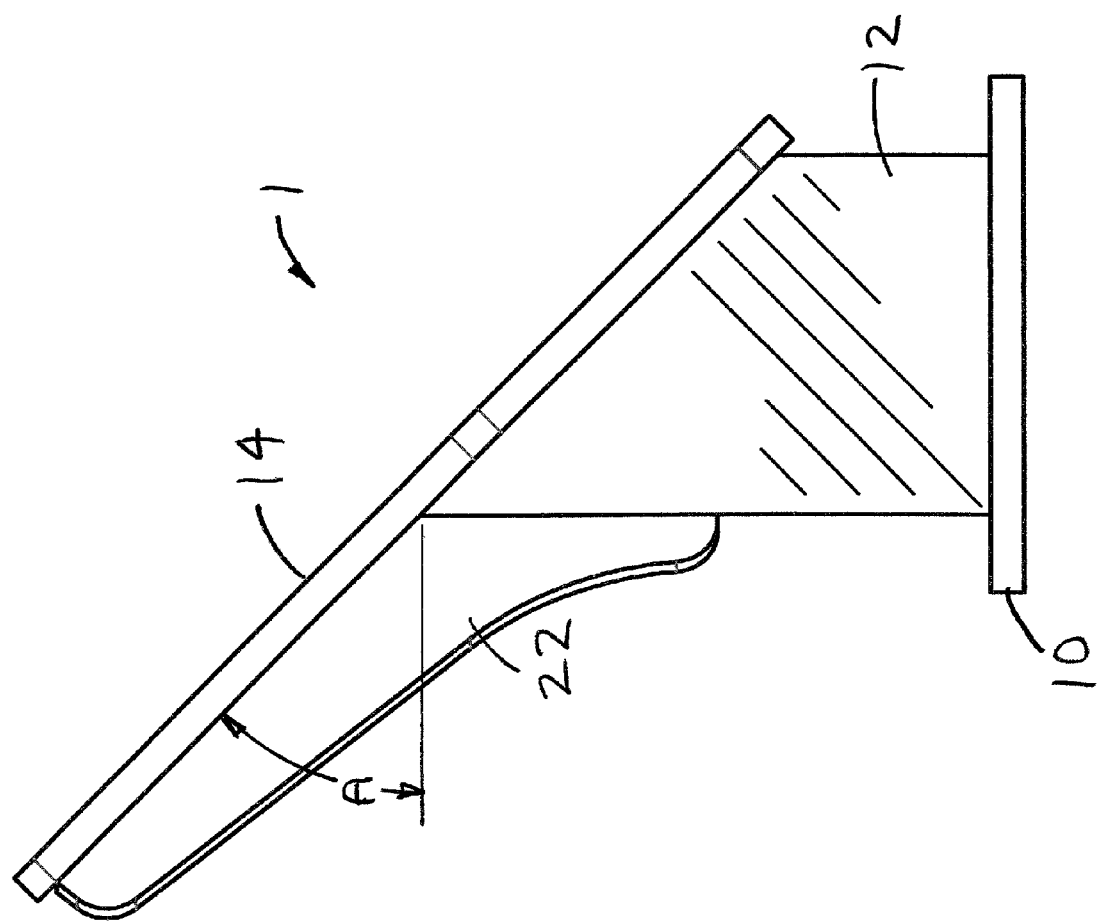
FIG. 3 is a side view of a wire stripper in accordance with the present invention.
Figure 4:
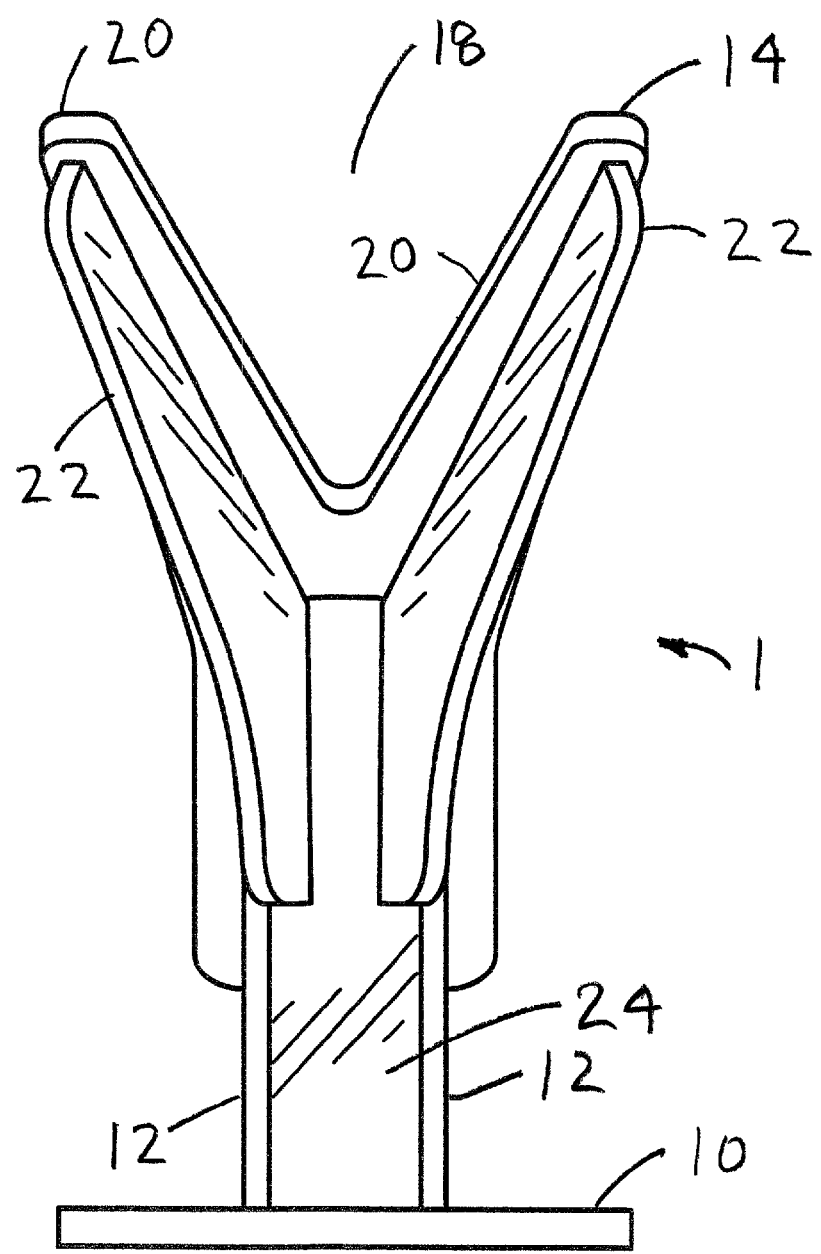
FIG. 4 is a rear view of a wire stripper in accordance with the present invention.

With reference now to the drawings, and particularly to FIG. 1, there is shown a perspective view of a wire stripper 1. With reference to FIGS. 2-4, the wire stripper 1 preferably includes a base plate 10, at least one vertical support plate 12 and a stripper plate 14. The base plate 10 includes a plurality of fastener holes 16. The at least one vertical support plate 12 extends upward from the base plate 10. A bottom of the stripper plate 14 is attached to a top of the at least one vertical support plate 12. A top of the vertical support plate includes an angle "A," such that the stripper plate 14 forms an acute angle with a horizontal plane. The angle "A" has a preferable range of between 25-65 degrees, but other angles could also be used. A V-shaped groove 18 is formed in substantially one end of the stripper plate 14 to form two fingers 20. The V-shaped groove 18 has a preferable angle "B" of between 35-75 degrees, but other angles may also be used. If the support gussets 22 are used, it is preferable to use two vertical support plates 12 and a vertical gusset plate 24. The vertical gusset plate 24 is attached between the two vertical support plates 12. The support gusset 22 is preferably attached to a bottom of the finger 20 and to the gusset plate 24.

Figure 5:
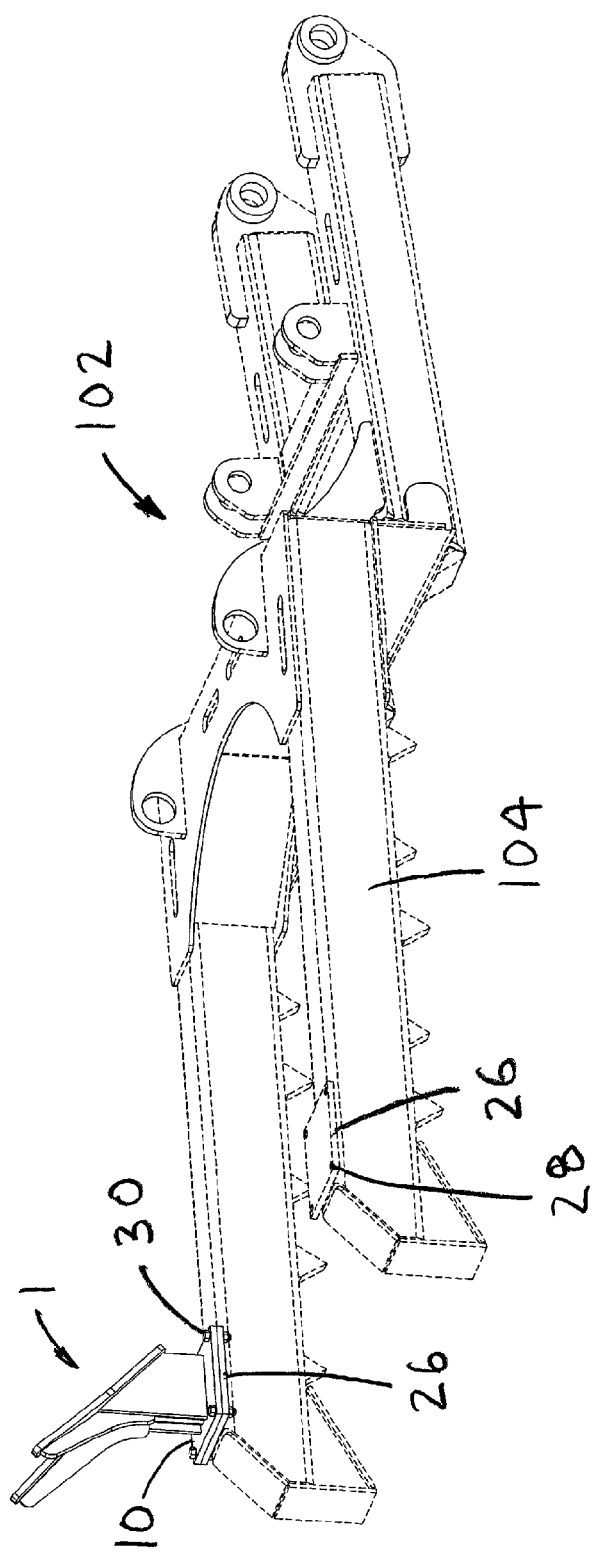
FIG. 5 is a perspective view of a hold down attachment with a pair of mounting plates for attachment of two wire strippers in accordance with the present invention.
Figure 6:
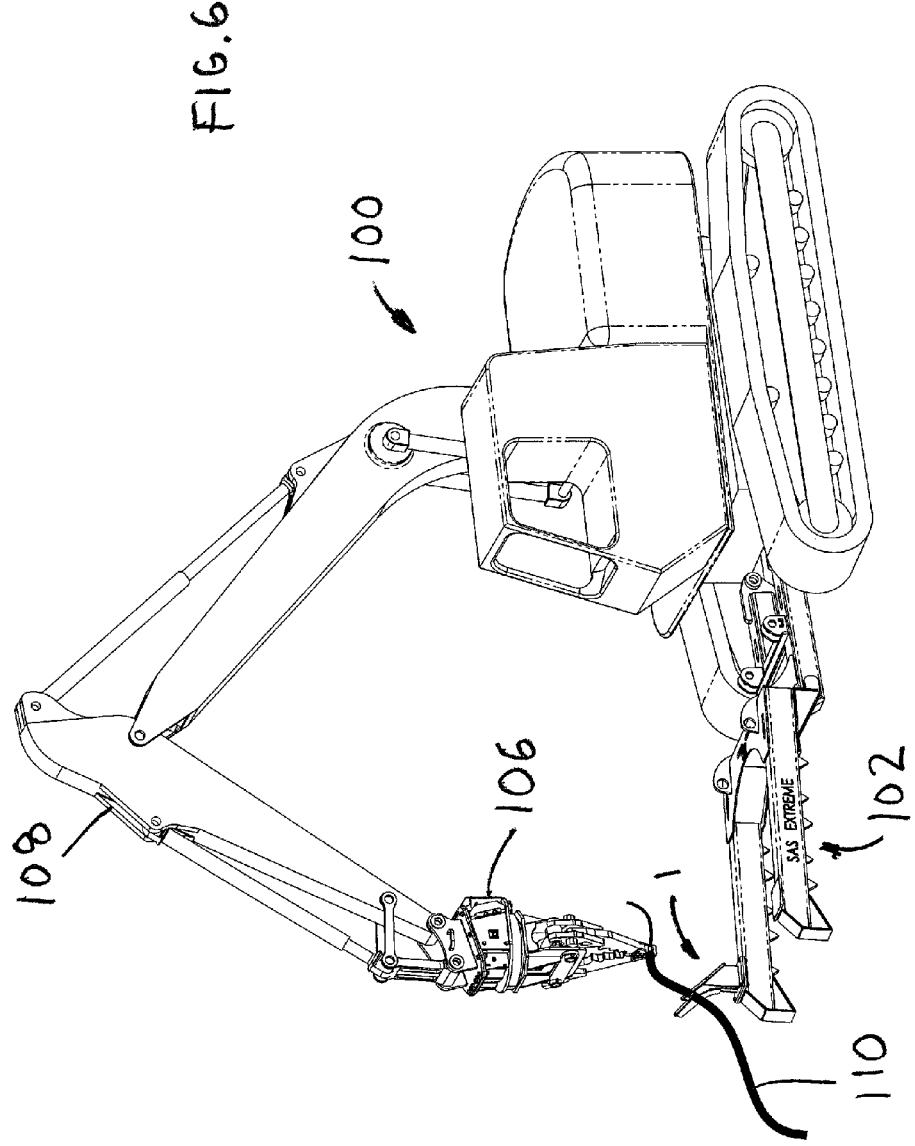
FIG. 6 is a perspective view of an auto dismantling excavator with an auto dismantling grappler pulling a vehicle wire harness through a wire stripper attached to a hold down attachment in accordance with the present invention.

With reference to FIG. 5, a mounting plate 26 is preferably retained on each arm 104 of a hold down attachment 102. The mounting plate 26 includes a plurality of retention holes 28, which mate with the plurality of fastener holes 16 in the base plate 10. The base plate 10 is secured to the mounting plate 26 with a plurality of fasteners 30. With reference to FIG. 6, the hold down attachment 102 is mounted to an auto dismantling excavator 100. In use, an auto dismantling grappler 106 is mounted to an end of a boom 108 of the auto dismantling excavator 100. An operator removes a wiring harness 110 from a vehicle with the auto dismantling grappler 106. The operator then inserts a first end of the wiring harness 110 into the V-shaped groove 18 of the stripper plate 14. The wiring harness 110 is then pulled through the stripper plate 14 to remove material and objects attached to the wiring harness 110, until the wiring harness 110 is completely pulled through the stripper plate 14.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A wire stripper in combination with a hold down attachment for use with an auto dismantling excavator, the auto dismantling excavator includes a dismantling grappler for removing a plurality of materials and objects from a wiring harness, comprising:

a hold down attachment includes at least one arm, a mounting plate is attached to a distal end of said at least one arm;

a base plate;

a stripper plate having a V-shaped groove formed in substantially one end thereof, first and second fingers are formed on each side of said V-shaped groove; and at least one vertical support plate extending upward from said base plate, an acute angle is formed on a top of said at least one vertical support plate, said stripper plate is attached to said top of said at least one vertical plate, wherein said stripper plate forms an acute angle with a horizontal plane, said base plate is removably attached to said mounting plate, the hold down attachment is capable of being secured to the auto dismantling excavator, wherein one end of the wiring harness is retained by the dismantling grappler, the wiring harness is placed in said V-shaped groove, the wiring harness is pulled through said stripper plate by said dismantling grappler, until the plurality of materials and objects are removed from the wiring harness.

2. The wire stripper in combination with a hold down attachment of claim 1 wherein:

a plurality of holes are formed through said base plate for the insertion of a plurality fasteners.

3. The wire stripper in combination with a hold down attachment of claim 1 wherein:

said acute angle has a value of between 25-65 degrees.

4. The wire stripper in combination with a hold down attachment of claim 1 wherein:

said V-shaped groove has angle between 35-75 degrees.

\* \* \* \* \*